US009652354B2

(12) United States Patent
Filimonov et al.

(10) Patent No.: US 9,652,354 B2
(45) Date of Patent: May 16, 2017

(54) UNSUPERVISED ANOMALY DETECTION FOR ARBITRARY TIME SERIES

(71) Applicant: MICROSOFT TECHNOLOGY LICENSING, LLC., Redmond, WA (US)

(72) Inventors: Vitaly Filimonov, Bothell, WA (US);
Panagiotis Periorellis, Munich (DE);
Dmitry Starostin, Aachen (DE);
Alexandre de Baynast, Aachen (DE);
Eldar Akchurin, Munich (DE);
Aleksandr Klimov, Burnaby (CA);
Thomas Minka, Cambridge (GB);
Alexander Spengler, Cambridge (GB)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 469 days.

(21) Appl. No.: 14/218,119

(22) Filed: Mar. 18, 2014

(65) Prior Publication Data

US 2015/0269050 A1   Sep. 24, 2015

(51) Int. Cl.
| | |
|---|---|
| G06F 11/30 | (2006.01) |
| G06F 11/34 | (2006.01) |
| G06N 7/00 | (2006.01) |
| G06N 99/00 | (2010.01) |
| G06Q 10/06 | (2012.01) |

(52) U.S. Cl.
CPC ...... *G06F 11/3409* (2013.01); *G06F 11/3452* (2013.01); *G06N 7/005* (2013.01); *G06N 99/005* (2013.01); *G06Q 10/06* (2013.01)

(58) Field of Classification Search
CPC ... G06F 21/552; H04L 63/1425; H04L 41/06; H04L 43/0811; H04L 41/147; H04L 41/16
USPC ........................................ 702/127, 182, 183
See application file for complete search history.

(56) References Cited

U.S. PATENT DOCUMENTS

| | | | |
|---|---|---|---|
| 7,346,593 | B2 | 3/2008 | Takeuchi et al. |
| 7,869,967 | B2 | 1/2011 | Marvasti et al. |
| 7,917,338 | B2 | 3/2011 | Basak et al. |
| 8,185,348 | B2 | 5/2012 | Shan et al. |

(Continued)

FOREIGN PATENT DOCUMENTS

WO    2012/020329 A1    2/2012

OTHER PUBLICATIONS

"Second Written Opinion Issued in PCT Application No. PCT/US2015/020314", Mailed Date: Feb. 9, 2016, 6 Pages.

(Continued)

*Primary Examiner* — An Do

(57) ABSTRACT

Examining time series sequences representing performance counters from executing programs can provide significant clues about potential malfunctions, busy periods in terms of traffic on networks, intensive processing cycles and so on. An unsupervised anomaly detector can detect anomalies for any time series. A combination of known techniques from statistics, signal processing and machine learning can be used to identify outliers on unsupervised data, and to capture anomalies like edge detection, spike detection, and pattern error anomalies. Boolean and probabilistic results concerning whether an anomaly was detected can be provided.

20 Claims, 5 Drawing Sheets

(56) References Cited

U.S. PATENT DOCUMENTS

| | | |
|---|---|---|
| 8,949,677 B1* | 2/2015 | Brundage ............ G06F 11/0745 714/48 |
| 2007/0289013 A1 | 12/2007 | Lim |
| 2008/0103729 A1* | 5/2008 | Barham .................. H04L 41/06 702/183 |
| 2010/0071061 A1 | 3/2010 | Crovella et al. |
| 2011/0178967 A1 | 7/2011 | Delp |
| 2013/0304710 A1 | 11/2013 | Nachev |

OTHER PUBLICATIONS

"International Preliminary Report on Patentability Issued in PCT Application No. PCT/US2015/020314", Mailed Date: Jun. 10, 2016, 8 Pages.

"International Search Report & Written Opinion Issued in PCT Application No. PCT/US2015/020314", Mailed Date: Jun. 15, 2015, 11 Pages.

Eriksson, Andre, "Anomaly Detection in Machine-Generated Data: A Structured Approach", In Doctoral Dissertation, KTH, Retrieved on: Jan. 31, 2014, 86 pages.

"Sumo Logic", Retrieved on: Jan. 31, 2014 Available at: http://www.sumologic.com/_downloads/Sumo_Logic_Tech_Brief_Anomaly_Detection.pdf.

* cited by examiner

UNSUPERVISED ANOMALY DETECTION FOR ARBITRARY TIME SERIES

BACKGROUND

An anomaly (also known as: outlier, novelty, noise, deviation, rare value or exception) can be defined as anything that differs from expectations. In computer science, anomaly detection refers to identifying data, events or conditions which do not conform to an expected pattern or to other items in a group. Encountering an anomaly may in some cases indicate a processing abnormality and thus may present a starting point for investigation. Traditionally, anomalies are detected by a human being studying a trace. A trace is a log of information that can come from an application, process, operating system, hardware component, and/or a network. Never an easy job, given the current complexity of today's computer systems, it is a job that is rapidly becoming close to impossible for a human.

Anomaly detection is classified as supervised, semi-supervised or unsupervised, based on the availability of reference data that acts as a baseline to define what is normal and what is an anomaly. Supervised anomaly detection typically involves training a classifier, based on a first type of data that is labeled "normal" and a second type of data that is labeled "abnormal". Semi-supervised anomaly detection typically involves construction of a model representing normal behavior from one type of labeled data: either from data that is labeled normal or from data that is labeled abnormal but both types of labeled data are not provided. Unsupervised anomaly detection detects anomalies in data where data is not manually labeled by a human.

SUMMARY

A system and method for unsupervised anomaly detection can enable automatic detection of values that are abnormal to a high degree of probability in any time series sequence. As used herein, a sequence refers to a progression of values in a set. A time series sequence or time series refers to any sequence of data in which each item in the sequence is associated with a point in time. Anomalies can be detected in real-time by monitoring and processing the corresponding time series, even when the time series has an evolving distribution, i.e., the time series is not stationary but instead, changes or evolves over time. Data in the time series is not labeled before being processed. Data in the time series is not labeled after being processed. The data is scored without using labeled data. A system for incorporating feedback or prior knowledge is not used. Statistical, signal procession and machine learning techniques can be applied to identify anomalies in time series. Anomaly detection can be based on using a combination of the Z-test and a technique that processes time series that follow the Gaussian distribution pattern.

A Z-test is a statistical test based on calculating the distance between the actual value of the current point and the average value of the corresponding sequence in units of its standard deviation (known as z-score). The outcome of the Z-test is a Boolean value indicating that the current point is an outlier or is not an outlier. Data that follows a Gaussian type of distribution refers to data that falls in a symmetrical bell curve shape.

A formal mathematical definition of one or more anomalies can be captured without supervision. Statistical methods taken from statistics, signal processing and machine learning can be used to model a time series and analyze its distribution to detect anomalies in the data. Projection of the input time series can be based on various algorithms included but not limited to linear prediction coding, first order derivative, second order derivative, etc. Projection refers to transformation of the incoming data as it goes through various stages in the pipeline, depending on the processing applied. Control of the frequency of scoring (that is, anomaly detection results) can be based on buffering using time windows of a variable range. The calibration and/or training of algorithms can be based on a specifiable number of data points from ten or more data points. A combination of Boolean and probabilistic results can be produced when an anomaly is identified, potentially increasing reliability. Results can be categorized based on the distribution and types of anomalies detected. The changes of a distribution of a time series can be dynamically monitored so that dynamic and automatic adjustment of the processing of the performance counters data points can occur.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
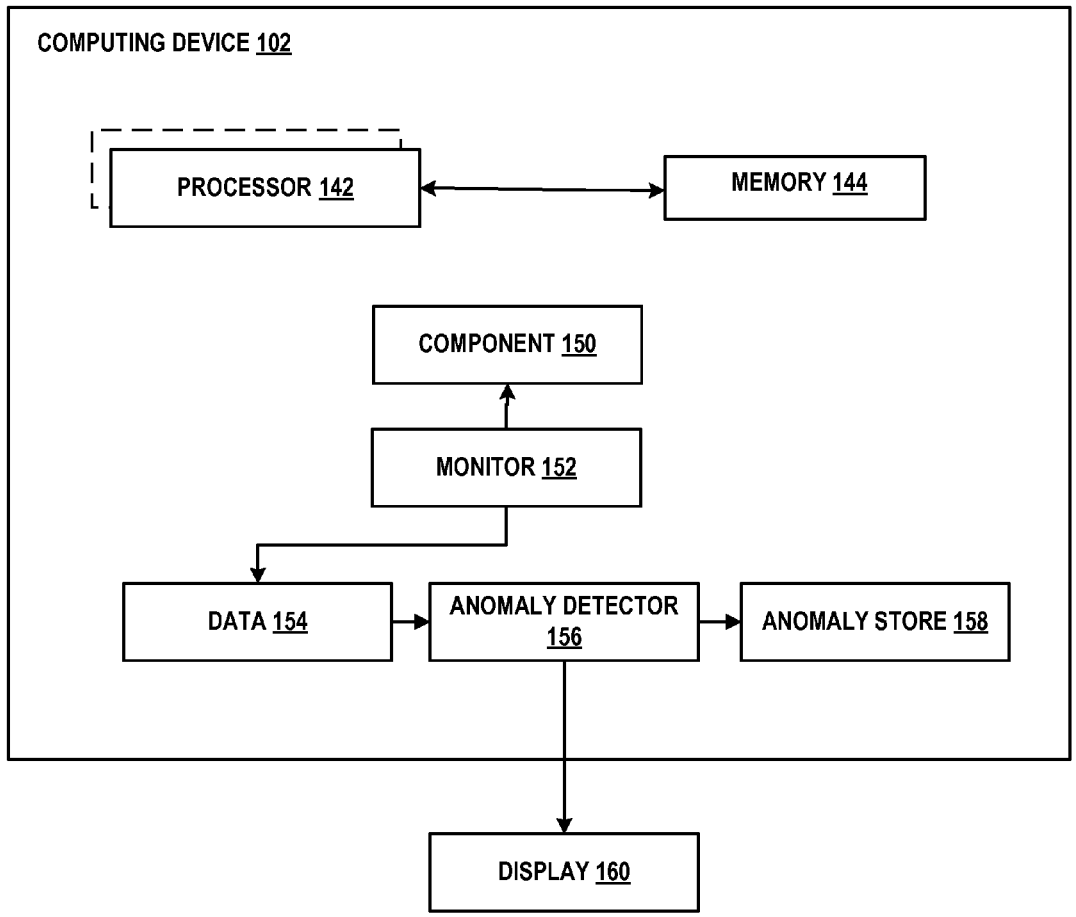
FIG. 1a illustrates an example of a system 100 that monitors a component and detects anomalies in time series produced by the component in accordance with aspects of the subject matter described herein.

Anomalies can be identified in a times series without knowing beforehand what anomalies of a particular sequence are. Statistical methods taken from statistics, signal processing and machine learning can be used to model a time series, to analyze its distribution and to predict what the anomalies are. The techniques described herein are widely applicable: the unsupervised anomaly detector described herein can detect anomalies in any executing application or service. To give one non-limiting example, one application is a cloud computing platform and infrastructure, such as but not limited to AZURE created by Microsoft Corporation. AZURE can be used to build, deploy and manage applications and services.

An executing application produces a number of data sequences called performance counters. Performance counters can reflect the health of the corresponding instance of the application running on particular hardware. Performance counters can include counters associated with CPU (central processing unit) load, memory, network I/O (input/output), exceptions rate, bytes in a heap, objects in memory stores and many others known to those of skill in the art. Typically, for a single application, more than one hundred counters are used for each hardware unit. Automatically detecting anomalies in the time series values can enable problems to be found more quickly and can enable the problems to be fixed as soon as they occur. Typically today counters are logged and examined later in an offline fashion. This approach can be insufficient today. Many situations in which performance counters are monitored need to have anomalies detected, the problem diagnosed and the situation rectified very promptly. Automatically detecting anomalies in continuously monitored components can enable an owner or operator of the component to be notified of anomalous behavior at the time it occurs and can therefore lead to decreased mean time to detect (MTTD) and to reduce mean time to mitigate (MTTM).

Historical data that describes how the application has behaved in the past may be unavailable. The unsupervised anomaly detector in accordance with aspects of the subject matter described herein can determine how the application should behave as the application or other type of component runs. Deducing the normal and abnormal behavior of a component quickly means there is typically not enough time to wait for a very large statistical sample to make predictions regarding the characteristics (normal versus anomalous) of a piece of data within a time series. The anomaly detector described herein can calibrate and/or train classifiers based on a specifiable number of data points from as few as ten data points. The anomaly detector described herein can adapt to accommodate a time series that changes dynamically. False positives (normal values mislabeled as anomalous) are minimized and almost no false negatives (anomalous values mislabeled as normal) are produced.

Anomalies can be detected in any performance counter for any executing component as the component executes or operates by continually monitoring and processing the performance counter data points. When an anomaly is detected, the anomaly can be stored. The anomaly can be displayed along with any related information to an observer (e.g., a customer, user interface, application, etc.). Types of anomalies detected can include at least: out of range value anomaly, spike anomaly, pattern error anomaly, and sudden variation or edge anomaly.

The anomaly detector as described herein can be implemented as a rule within a monitoring infrastructure. Such a rule may encapsulate a piece of logic that is applied to a time series. A rule can process the data points of a particular performance counter of a particular component. In accordance with some aspects of the subject matter described herein, within a rule, in one phase the distribution of the data is detected, in another pre-processing is performed, in another anomalies are detected and in another post-processing is performed. The results or another type of indication of the anomalies can be provided.

In the first phase listed above, the distribution of the time series of a performance counter can be determined. The distribution of the time series can be a description of the relative number of times each possible value occurs. For example, in the case of a CPU performance counter, values of 98% usage are rare, while values in the range of 20%-70% can be considered normal and usual. In the pre-processing step features can be extracted from the data points, such as but not limited to the distance of the current data point value to the average value of the time series. An anomaly detection algorithm can be applied to the data in the anomaly detection phase. The result, if it is a positive (i.e., a positive indicates identification of an anomaly) the result can be sent to the post-processing phase. Depending on the type of anomaly detected, different processing paths can be followed. If a data point is characterized as more than one anomaly, (e.g., both a spike and an out-of-range value) post-processing can ensure that only one anomaly event is raised, thus reducing noise.

The different analytics processing paths may execute in parallel. The processing paths may receive all incoming performance counter time series as input. The normal behavior of the time series can be observed in an initial "warm up phase." During the warm up phase, in accordance with some aspects of the subject matter described herein, anomaly alarms are not raised. The incoming data points can be used to train classifiers using the Z-test and Gaussian distribution algorithms. After the warm up phase, detection of anomalies can begin.

The edge detection, spike detection and pattern error processing paths may process data whose time series follows a Gaussian distribution pattern. Because not all performance counters follow a Gaussian distribution pattern, an additional anomaly detection processing path can be provided. This path can receive any time series distribution. To determine the behavior the data stream exhibits and consequently classify the time series into either one that follows a Gaussian distribution pattern or one that does not follow Gaussian distribution, the standard Z-test algorithm can be applied on the raw data. The standard deviation of the inliers can be estimated and compared to a threshold that is dynamically determined during the warm up phase. For example, for an all-zero sequence interspersed with occasional ones, the standard deviation of the inliers will remain zero, i.e., below the threshold and no anomaly would be raised. Failing to apply a technique such as the Z-test on the raw data can widen the spikes and can generate more noise when filtering isolated outliers.

Incoming data points can be sent in parallel to the Z-test algorithm (out of range detection) and to the Gaussian based processing paths. The Z-test inliers (normal values) can be communicated to the distribution analysis component that determines the statistical distribution of the sequence. This can be done continuously. It is possible for a non-Gaussian sequence to switch to a Gaussian patterned sequence. At the same time the incoming data point can be sent to a component that smoothes out the data signal, thereby removing noise.

For each of the Gaussian processing paths, features including but not limited to the mean, the distance from the mean, the standard deviation etc. can be received. The pre-processing results can be sent to a pair of algorithms including the Z-test algorithm and an algorithm dedicated to processing data that follows a Gaussian distribution pattern. In operation, in accordance with some aspects of the subject matter described herein, each of the pairs of algorithms are trained (e.g., during the warm up phase) according to the data received from each processing path independently of the other processing paths.

During the post-processing phase all results produced by the anomaly detection processing pathways and the distribution detection component can be processed. If anomalies are detected, the processing pathway that detected the anomalies can be determined. If the distribution of a stream is Gaussian and the anomalies were detected by one or more of the Gaussian processing paths, the anomaly event is raised. If the detected anomaly matches other distributions (discreet values, zeroes, binary) and the anomaly is detected by the out of range processing pathway, the anomaly event can also be allowed to propagate to the same or another performance store. All other detected anomalies can be ignored.

The Z-test, linear prediction coding (for identifying errors in patterns), low-pass filter and the Kolmogorov-Smirnov test (algorithm for identifying the distance to the normalized Gaussian distribution) are standard algorithms well-described in the machine learning and signal processing literature.

Unsupervised Anomaly Detection for Arbitrary Time Series

FIG. 1a illustrates an example of a system 100 that monitors a component and/or detects anomalies in time series produced by the component in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, and so on. A computing device such as computing device 102 can include one or more processors such as processor 142, etc., and a memory such as memory 144 that communicates with the one or more processors.

System 100 can include one or more of the following items: a component such as component 150, a monitor such as monitor 152, data such as data 154, an anomaly detector such as anomaly detector 156, an anomaly store such as anomaly store 158 and/or a display 160. System 100 can include one or more program modules comprising a monitor 152. Monitor 152 can monitor execution or operation of a component such as component 150. Monitor 152 can monitor component 150 continuously or intermittently or on demand. Monitor 152 can collect data 154 produced by or associated with component 150. Monitor 152 can be incorporated within anomaly detector 156.

Component 150 can be an application, process, operating system, piece of hardware, network, network switch or any component that produces or is accompanied by the production of data 154 including but not limited to performance counters. Performance counters can include performance counters associated with CPU load, memory, network I/O and many other types of performance counters known to those of skill in the art. The data 154 can include trace data. The data 154 can include trace temporal sequences that can be viewed as time series of numbers or strings. The data 154 can be used by the anomaly detector 156 to provide information about a component 150 such as whether component 150 is operating properly or is malfunctioning. Data 154 can be collected continuously or intermittently or on demand or a combination thereof. Some or all of the data 154 collected by monitor 152 can be provided to an anomaly detector such as anomaly detector 156.

Anomaly detector 156 can process some or all of the data 154 received from monitor 152. Anomaly detector 156 can automatically detect values in time series data that are out of the normal range of expected values. Anomaly detector 156 can automatically detect values in time series data that are out of the normal range of expected values even in the absence of historical data that describes how the component 150 has behaved in the past. Anomaly detector 156 can automatically detect values in time series data that are out of the normal range of expected values dynamically, as the component is executing. Anomaly detector 156 can automatically adapt to changes in the data produced by or associated with component 150. Anomaly detector 156 can automatically detect anomalies in any performance counter in any application in real-time by continuously monitoring and evaluating performance counter data points. Anomaly detector 156 can use the time series data to analyze a cause of a problem, predict a problem before it happens or react to a problem as quickly as the problem is detected. Anomaly detector 156 can store information associated with anomalies in an anomaly store such as anomaly store 158. Information associated with anomalies can be displayed on display 160. All or some of: component 150, monitor 152, data 154, anomaly detector 156, anomaly store 158 and display 160 can be on the same computing device or on different computing devices.

Figure 1B:
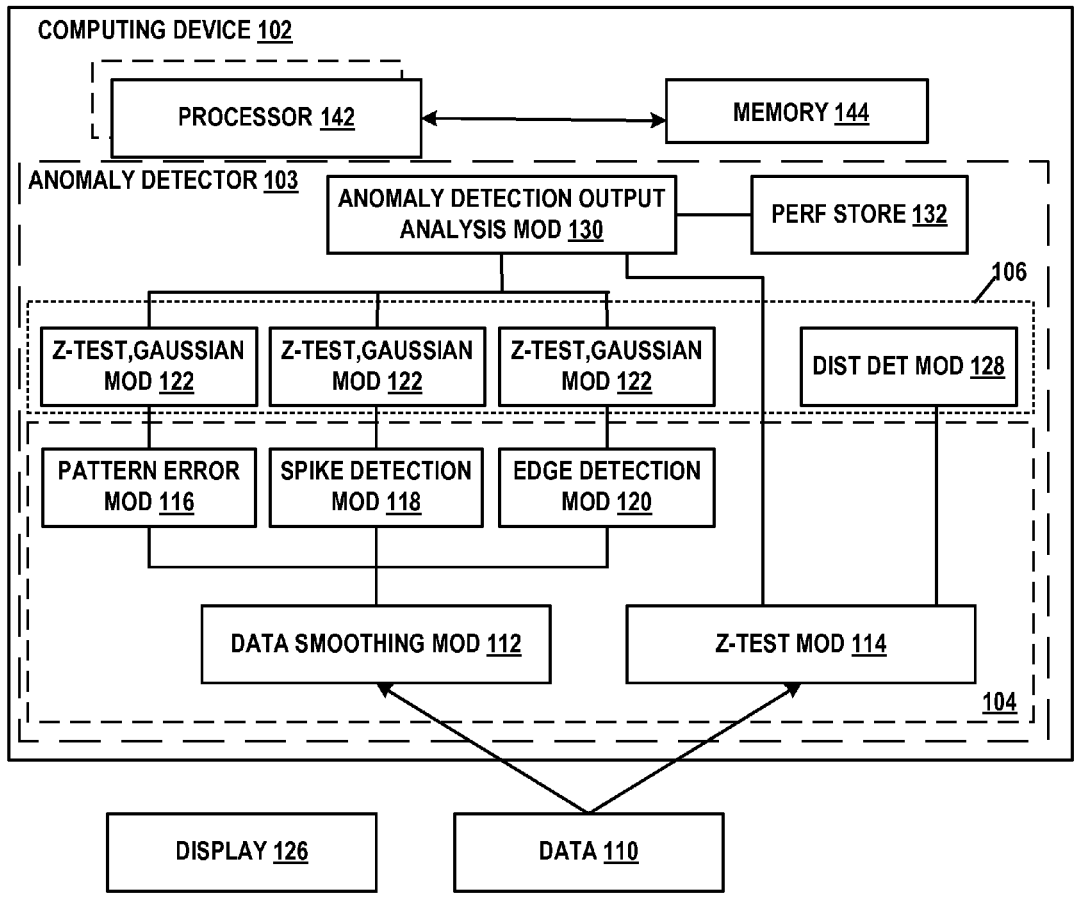
FIG. 1b illustrates a more detailed example of a portion of system 101 in accordance with aspects of the subject matter described herein.

FIG. 1b illustrates a block diagram of an example of a system 101 that detects anomalies in arbitrary time series in accordance with aspects of the subject matter disclosed herein. All or portions of system 101 may reside on one or more computers or computing devices such as the computers described below with respect to FIG. 3. System 101 or portions thereof may be provided as a stand-alone system or as a plug-in or add-in.

System 101 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 101 can include one or more computing devices such as, for example, computing device 102. Contemplated computing devices include but are not limited to desktop computers, tablet computers, laptop computers, notebook computers, personal digital assistants, smart phones, cellular telephones, mobile telephones, and so on. A computing device such as computing device 102 can include one or more processors such as processor 142, etc., and a memory such as memory 144 that communicates with the one or more processors.

System 101 can include one or more program modules that comprise an anomaly detector such as anomaly detector 103. Anomaly detector 103 can include one or more program modules (not shown) that extract performance counter data points from data. Alternatively, data extraction program modules may be external to the anomaly detector 103. The data provided can come from a monitor such as but not limited to monitor 152 of FIG. 1a. Anomaly detector 103 can include one or more program modules (not shown) that detect distribution of data. Alternatively, data distribution program modules may be external to the anomaly detector 103. The distribution of a time series of a performance counter can be a description of the relative number of times each value occurs. In the case of a central processing unit (CPU) for example, values of 98% usage are rare as opposed to values in the range of 20-70%. Thus, values in the range of 20% to 70% can be considered normal and values of 98% usage can be considered anomalies.

Anomaly detector 103 can include one or more program modules that perform a pre-processing phase such as pre-processing modules 104, one or more program modules that perform an anomaly detection phase such as anomaly detection phase modules 106 and one or more modules that perform a post-processing phase such as anomaly detection output analysis module 130. Anomaly detector 103 can also include one or more anomaly stores such as performance counter store 132.

Pre-processing modules 104 can include one or more of the following: a data smoothing module 112, a Z-test module 114, a pattern error detection module 116, a spike detection module 118, and/or an edge detection module 120. Anomaly detection phase modules 106 can include one or more of: a combined, Z-test and/or Gaussian distribution processing module such as Z-test, Gaussian module 122, and/or a distribution detector module 128. Results can be displayed on a display device such as display 126. Preprocessing modules 104 can extract features from the data points. Features can include features such as the distance of the current data point value to the average value of the time series, etc.

Anomaly detector 103 can receive data such as data 110. Data 110 can be any time series data. Data 110 can be data sequences including but not limited to performance counters produced by an executing or operating component such as component 150 of FIG. 1a. Performance counters can include counters associated with CPU load, memory, network I/O (input/output) and so on. Performance counters can be received from applications, processes, operating systems, hardware components, network switches, and so on.

Data 110 can be received from a performance monitoring system that monitors one or more components such as executing applications (not shown), one or more processors such as processor 142, etc., memory such as memory 144, etc. Data 110 can be received from a cloud computing platform and infrastructure, such as but not limited to AZURE created by Microsoft Corporation. Data 110 can be received from one or more computers or computing devices. Data 110 may be provided to a data smoothing module such as data smoothing module 112 that can reduce noise. Data smoothing module 112 can be a low pass filter. Undesirable frequencies within the data 110 can be removed using a low pass filter based on a design such as but not limited to the design of the Chebychev filter. Chebyshev filters are analog or digital filters that minimize the error between the idealized and the actual filter characteristic over the range of the filter, but have ripples in the pass band. The low-pass filter in accordance with some aspects of the subject matter described herein is part of the pre-processing phase. The low-pass filter can filter out small variations in the input time series. (These small variations may otherwise deteriorate the performance results of the outlier processing pathway). Filtering using the low-pass filter can reduce the numbers of false positives. In accordance with some aspects of the subject matter described herein, a transverse filter of order 20 can be used. A transverse filter instead of an auto-regressive filter can be chosen for its stability. Because no a priori statistical knowledge of the input time series may be available, an auto-regressive filter could become unstable for some input sequences. Data 110 may simultaneously be provided to a Z-test module such as z-test module 114.

In accordance with some aspects of the subject matter described herein, multiple processing paths can run in parallel. Each of the processing paths detects a single type of anomaly. A first type of processing path can process data that follows a Gaussian distribution pattern while a second type of processing path can process data that does not follow a Gaussian distribution. Processing path 1 (data 110 to Z-test module 114 to distribution detection module 128) can detect an out-of-range anomaly based on individual data points. In this processing path, an out of range anomaly can be detected (e.g., a value of a single data point is significantly out of range). The out of range anomaly can be calculated as per data point. If the absolute value of the difference between the value of the current data point and the average of the time series of the corresponding performance counter is larger than the threshold, an anomaly of type "Out of Range" can be raised.

In accordance with some aspects of the subject matter described herein, other processing paths (for data that follows a Gaussian distribution) can detect an anomaly based on smoothed out data points. Processing path 2 (data 110 to data smoothing module 112 to edge detection module 120) can detect an edge anomaly. An edge anomaly refers to the occurrence of a sharp drop or sharp rise in the performance counter time series. If the absolute value of the drop or the rise is larger than the standard deviation of the performance counter time series multiplied by the threshold calculated during the warm-up phase, an anomaly of type "Edge Detection" can be raised.

Processing path 3 (data 110 to data smoothing module 112 to spike detection module 118) can detect a spike anomaly. A spike anomaly corresponds to the presence of a positive or a negative spike in the performance counter sequence. If a sequence of the average values is identified as a spike, an anomaly of type "Spike Detection" can be raised. Technically, this is equivalent to comparing the second order derivative of the average values to a threshold calculated during the warm up phase. Exceeding the threshold indicates an anomaly.

Processing path 4 (data 110 to data smoothing module 112 to pattern error detection module 116) can detect a linear prediction error or pattern error anomaly. A linear prediction error anomaly can be a result of the occurrence of an unexpected pattern in the performance counter sequence. This can be particularly significant when the signal is a repeated pattern. The time series can be modeled as an auto-regressive process with Gaussian noise during the warm up phase. Assuming the sequence remains stationary during the whole execution phase, the auto-regressive process can predict an expected value for each upcoming data point. If the absolute value of the difference between the expected value and the actual value is larger than a threshold defined during the warm up phase, an anomaly of type "Prediction Error" can be raised.

Algorithms used in combination for detecting anomalies in the anomaly detection phase can include: an algorithm dedicated to processing data that follows a Gaussian distribution and a Z-test algorithm. The Gaussian algorithm can output a variable that indicates the probability of a data point being an inlier or an outlier. A decision can then made based on the probability value to determine whether or not an event is raised.

A Z-test is a statistical test, based on calculating the distance between the actual value of the current point and the average value of the corresponding sequence in units of its standard deviation (known as z-score). The outcome is a Boolean value indicating whether the actual point is an outlier or not.

During the algorithm training (warm up phase), the algorithms involved in the pathways can calibrate their internal parameters based on the actual values of the corresponding performance counter sequence. The warm up phase can enable the algorithms that analyze performance counters to determine what the typical or normal behavior of the counter is and compare against the normal distribution of the performance counter values. The warm up phase enables accurate results to be obtained, reducing false positives. A false positive is when an anomaly is erroneously raised. The warm up phase can also be called the training phase. The warm up phase in accordance with aspects of the subject matter described herein is entirely automated. No human intervention or additional information is needed. The pathways described herein can start detecting anomalies after the warm up phase ends. The default duration of the warm up phase can be set to 30 minutes, i.e., approximately 30 data points (given a rate of 1 data point per minute). In accordance with aspects of the subject matter described herein the default warm up period can be changed by changing a value in a configuration file. Algorithms can be further trained and can continue to learn beyond the initial warm up phase.

The input for the warm up phase can be raw performance counter values. The first configurable number of data points can be collected in a buffer and used to calibrate the respective anomaly detection algorithms. Although no output from the warm up phase is generated, the internal state of the anomaly detection algorithms can be impacted. The state of the anomaly detection algorithms can be represented by few values of data type double. For some algorithms such as the Gaussian distribution algorithm the state can be a set of 6 values of data type double and 3 of data type integer, while for the Z-test the state can be a set of 4 values of data type double. Persistence of this state can guarantee that the algorithms maintain knowledge of the entire history of the performance counter even beyond re-cycling and re-deployment.

Multiple pathways that correspond to the types of anomalies detected can be implemented. Each set of pathways can detect anomalies in a single performance counter sequence of a single component. In accordance with some aspects of the subject matter described herein, one pathway set per performance counter can be deployed.

For the anomaly of type "Out of Range", each data point can be processed sequentially. In accordance with some aspects of the subject matter described herein, no buffering is needed. Suppose that a sequence of data from an object is retrieved from a rule corresponding to a single performance counter and a single component. Each data point of the sequence can be provided to the Z-test, which can determine whether the data point is an outlier. Outliers can be sent to post-processing for anomaly detection output analysis. The Z-test can indicate the result using a Boolean value (true or false). Inliers (normal values) can be sent to the distribution analysis component.

For the edge detection pathway, assume that a sequence of data from an object from a rule corresponding to a single performance counter and a single component is received. The sequence can be buffered using a tumbling (re-use) window of 30 minutes. Assuming a sampling rate of a data point per minute, the buffer size will comprise 30 data points. The arithmetic average over the buffer can be calculated. The sampling rate of the resulting sequence is one value per window duration, i.e., one value every 30 minutes. On this resulting sequence, the first derivative can be calculated, corresponding to the difference between the average of the values of the current buffer and the average of the values of the preceding buffer. The result can be provided to the Z-test and Gaussian outlier detector that can determine whether the first derivative value is an outlier. The Z-test can indicate the result using a Boolean value (true or false). Meanwhile the Gaussian outlier detector can infer the probability that the first derivative value corresponds to an outlier.

For the spike detection pathway, the second order derivative is calculated instead of the first order derivative. All the other components of the pathway are the same as the edge detection pathway.

For the pattern error detection pathway, the data can processed in the same way as in the other pathways. An additional algorithm can be used to determine prediction error over the sequence of the average values. The average value determined per time window can be provided to the linear prediction coder that can generate the expected value. The absolute value of the difference between this value and the actual value will be provided to the Z-test and the Gaussian outlier detector that can determine whether it is an outlier. Detection of an outlier can correspond to an erroneous pattern in the original sequence. The state of the linear prediction coder can be stored in a one dimensional array of type double.

To raise an anomaly event, any policy can be applied to the results of the pathways to determine whether a data point indicates an anomaly. One option is to utilize an anonymous policy in which the pathway characterizes a data point as abnormal before an anomaly event is raised. Other policies can apply. The Z-test algorithm can output a Boolean value (true or false). The Gaussian algorithm can output a probability whose value ranges from 0 to 1. To make the anomaly detection more reliable the following reasoning can be applied: If the probability is over a pre-defined threshold (e.g., above 65%) and the Z-Test confirms that the data point is an anomaly an anomaly event can be raised and sent for post processing.

The raised anomaly event can include at least the following fields
1. A time stamp. In the event that a window operation has been applied, the time stamp will correspond to the end of the window,
2. The pathway identifier which corresponds to the type of anomaly ("Edge Detection", "Out of Range", "Spike Detection", "Prediction Error"),
3. The performance counter name.

Each pipeline can raise its own anomaly events. Post processing can be a final step in which the anomaly events raised from each pathway are aggregated. In the event that a data point is declared to be an anomaly in more than one pathway, the anomaly events can be combined into a single event which carries all the identifiers of the pathways in which it was detected.

Figure 2A:
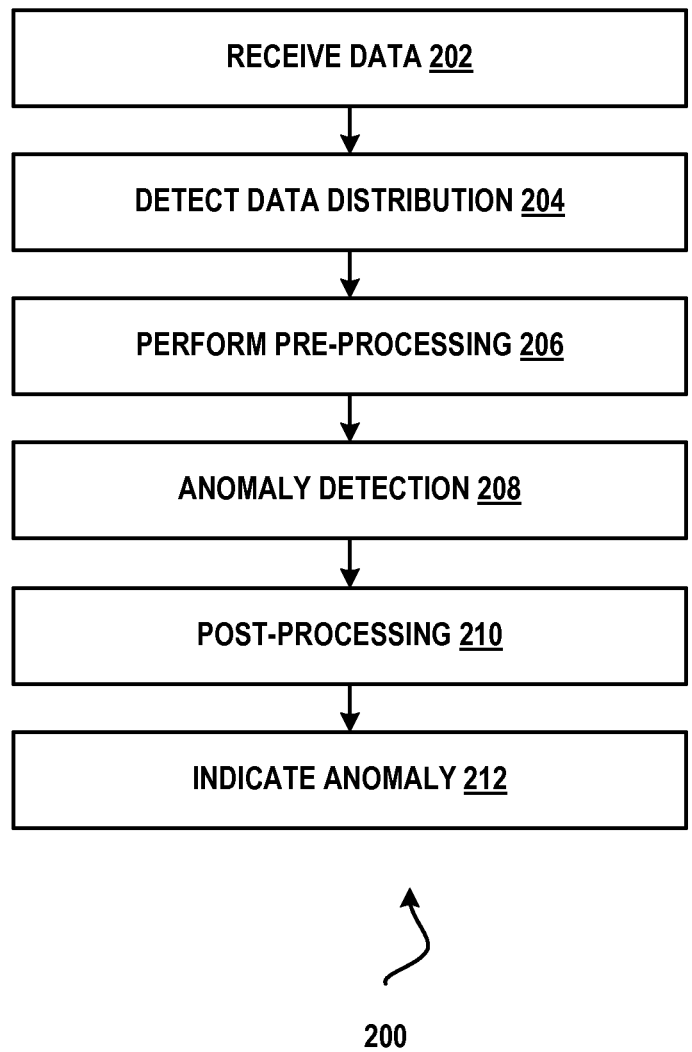
FIG. 2a illustrates an example of a method 200 that detects anomalies in accordance with aspects of the subject matter disclosed herein.

FIG. 2a illustrates an example of a method 200 for unsupervised anomaly detection in accordance with aspects of the subject matter described herein. The method described in FIG. 2a can be practiced by a system such as but not limited to the ones described with respect to FIGS. 1a and 1b. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

At operation 202, a component can be monitored, as described more fully above. The component can be associated with or can produce data including performance counters. Performance counter data can be extracted from the data produced by the component. The data can be viewed as time series of numbers or strings. The data can be received by an anomaly detector as described more fully above. Performance counter data points can be extracted from the data received. At operation 204 the data distribution that the data follows can be determined. In accordance with some aspects of the subject matter described herein, to determine the behavior the stream of data exhibits, a Z-test algorithm can be applied to the raw data. The standard deviation of the inliers can be compared to a threshold that can be dynamically determined during a warm up phase. For example, for an all-zero sequence with occasional ones, the stand deviation of the inliers will remain zero, i.e., below the threshold and no outlier is raised. The incoming data points can be sent in parallel to both the Z-test algorithm (out of range detection) and to a data smoothing module as described more fully above.

At operation 206 pre-processing can be performed. During the pre-processing operation, features can be extracted from the data points. Features can include the distance of the current data point value to the average value of the time series. At operation 208 anomalies can be detected. In accordance with some aspects of the subject matter described herein four different types of anomalies can be detected using four analytics pipelines during anomaly detection. The four pipelines can execute in parallel. Each pipeline can take incoming performance counter time series as input. During anomaly detection, each pipeline can attempt to learn the normal behavior of the time series in an initial warm up phase. In accordance with some aspects of the subject matter described herein, during the warm up phase, anomaly alarms are not raised. During the warm up phase, incoming data points can be used to train the combination Z-test/Gaussian distribution algorithms. In accordance with some aspects of the subject matter described herein, the warm up phase can typically last from 30 to 60 minutes.

After the warm up phase the analytics pipelines can start detecting anomalies. Edge detection, spike detection and pattern error pipelines can work with data whose time series follows a Gaussian distribution pattern. Data whose time series does not follow Gaussian distribution can be processed by the out of range pipeline. If the result of the anomaly detection operation is a positive (an anomaly has been identified), the anomaly can be sent to post processing at operation 210. In the event that a data point is characterized by more than one anomaly (e.g., a data point value corresponds to a spike and to an out of range value) post-processing operations can ensure than only one anomaly event is raised, which can reduce noise. At operation 212 results can be provided. Results can be provided in visual or electronic format.

Figure 2B:
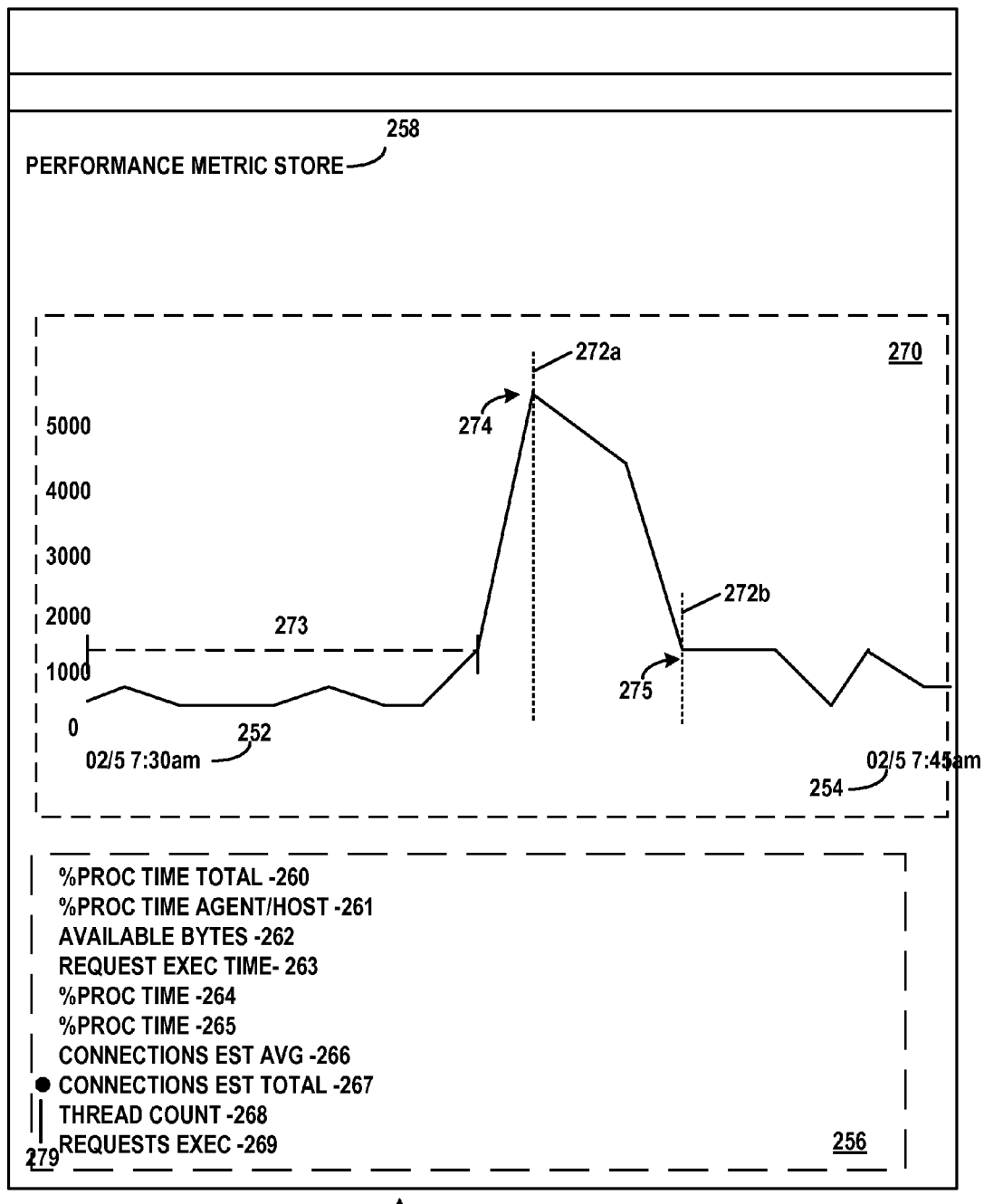
FIG. 2b illustrates an example of an anomaly display 250 in accordance with aspects of the subject matter disclosed herein and FIG. 3 is a block diagram of an example of a computing environment in accordance with aspects of the subject matter disclosed herein.

FIG. 2b illustrates an example of anomaly results 250 that can be displayed for a selected time interval 02/5 7:30 am 252 to 02/5 7:45 am 254. Anomaly results can be provided in any tangible form. A table 256 can include metrics that can be tracked for a component 258 ("Performance Metric Store"). In anomaly results 250, traceable metrics can include for example: % Total Processor Time 260, % Agent/Host Processor Time 261, Available Bytes 262, Request Execution Time (Total) 263, % Processor Time 264, % Processor Time (Total) 265, Connections Established (Average) 266, Connections Established (Total) 267, Thread Count 268, Requests Executing 269 and so on). In anomaly results 250 one metric, Connections Established (Total) 267 has been selected (indicated by radio button 279. A chart depicting how that metric changed and a count of the anomalies detected is displayed in chart 270. In chart 270, two anomalies have been detected within the interval indicated by the two vertical lines vertical line 272a and vertical line 272b. Hovering a pointer over one of the vertical lines can trigger a display of the value of the anomaly and the time at which the anomaly occurred.

The detected anomalies comprise abnormal behavior in the executing application: before the first anomaly at area 273 the total number of network connections established by the computers miming the application is hovering under 1000. At point 274 indicating the first displayed anomaly, the number of connections increased sharply to >5000 and then sharply dropped back after just two minutes at point 275 indicating the second anomaly. Something happened that may require the attention of an owner or operator of the application. It will be appreciated that the display illustrated in FIG. 2b is a non-limiting example of a display that can be provided to a user to provide information concerning detected anomalies.

Example of a Suitable Computing Environment

Figure 3:
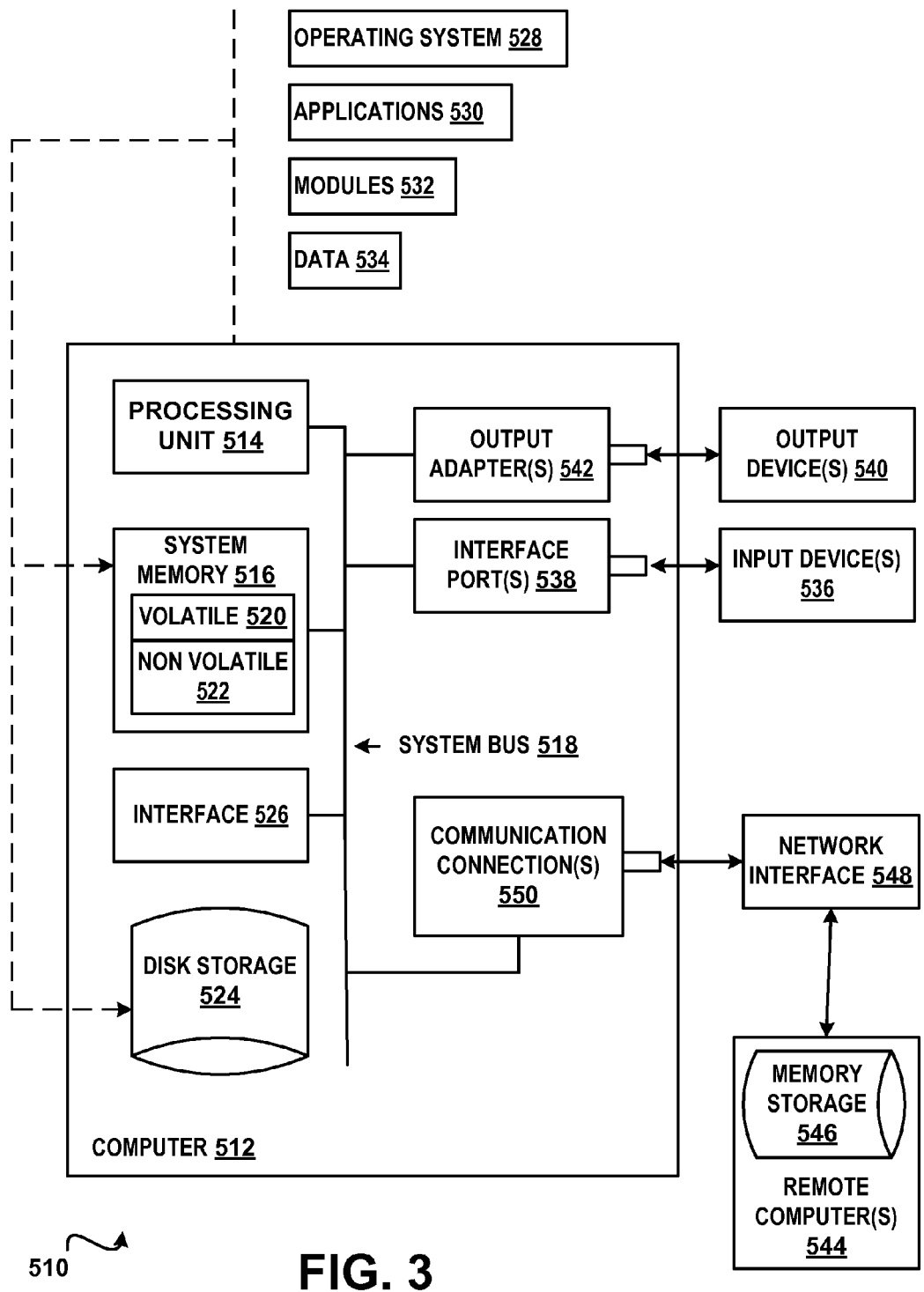

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system comprising:
  at least one processor:
  a memory connected to the at least one process; and
  at least one module comprising an anomaly detector that causes the at least one processor to identify anomalies comprising unexpected values in a time series of performance counters generated by a component by:
    during execution of the component:
      continuously monitoring data points from the performance counters;
      determining a distribution of data points within the time series, wherein the time series changes dynamically during execution of the components;

performing pre-processing of the time series
detecting anomalies within the time series; and
reacting to a problem associated with the detected anomalies.

2. The system of claim 1, further compromising providing information associated with the detected anomalies.

3. The system of claim 1, wherein the data provided to the anomaly detector for training is only unlabeled data.

4. The system of claim 1, wherein an anomaly detected by the anomaly detector is one of:
an out of range anomaly, a spike anomaly, an edge anomaly or a pattern error anomaly.

5. The system of claim 1, further comprising:
a module that causes the at least one processor to:
detect an anomaly using a combination of techniques comprising a Z-test and a Gaussian distribution technique.

6. The system of claim 1, further comprising:
a module that causes the at least one processor to:
dynamically adjust processing of the performance counters.

7. The system of claim 1, further comprising:
a module that causes the at least one processor to:
detect anomalies within a time series hiving an evolving distribution.

8. A method comprising:
continuously monitoring, by a processor of a computing device, data points from performance counters generated by a component;
determining a distribution of the data points within a time series, wherein the time series changes dynamically during execution of the component;
providing the data points to a plurality of processing paths in parallel;
identifying anomalies within the time series in the absence of labeled data defining anomalous data and in the absence of labeled data defining normal data;
providing at least one of Boolean or probabilistic results concerning anomaly detection; and
reacting to a problem associated with the detected anomaly.

9. The method of claim 8, wherein an anomaly of the identified anomalies is an edge anomaly.

10. The method of claim 8, wherein an anomaly of the identified anomalies is an out of range anomaly.

11. The method of claim 8, wherein an anomaly of the identified anomalies is a pattern error anomaly.

12. The method of claim 8, wherein an anomaly of the identified anomalies is a spike anomaly.

13. The method of claim 8, further comprising:
adapting to a time series having an evolving distribution.

14. A device, comprising:
at least one processor and a memory;
the at least one processor configured to identify anomalies comprising unexpected values in a time series of performance counters generated by a component, by performing actions during execution of the component that:
continuously monitor data points from the performance counters;
determine a distribution of data points within a time series sequence of performance counters, wherein the time series changes dynamically during execution of the component;
perform pre-processing comprising classification of the time series based on a statistic test of the time series;
detect anomalies within the time series; and
perform post-processing of the detected anomalies in order to react to a problem associated with at least one detected anomaly.

15. The device of claim 14, wherein the at least one processor is further configured to:
detect an out of range anomaly by determining if an absolute value of a difference between a value of the current data point and an average of the time series of a corresponding performance counter is larger than a threshold value calculated during a training phase of anomaly detection.

16. The device of claim 14, wherein the at least one processor is further configured to:
detect an edge anomaly by determining if an absolute value of a drop or rise is larger than a standard deviation of the time series multiplied by a threshold value calculated during a training phase of anomaly detection.

17. The device of claim 14, wherein the at least one processor is further configured to:
detect a spike anomaly by determining if a second order derivative of an average value exceeds a threshold value calculated during a training phase of anomaly detection.

18. The device of claim 14, wherein the at least one processor is further configured to:
detect a pattern error anomaly by modeling a sequence as an auto-regressive process with Gaussian noise during a warm up phase of anomaly detection;
predict an expected value for each upcoming data point in the time series; and
in response to determining that an absolute value of a difference between the expected value and an actual value is larger than a threshold defined during the warm up phase.

19. The device of claim 14, wherein the at least one processor is further configured to:
control frequency of scoring based on buffering of time windows of variable range.

20. The device of claim 19, wherein the at least one processor is further configured to:
score anomalies in the absence of labeled training data.

* * * * *